United States Patent
Kulkarni et al.

(10) Patent No.: US 7,568,068 B2
(45) Date of Patent: Jul. 28, 2009

(54) DISK DRIVE WITH CACHE HAVING VOLATILE AND NONVOLATILE MEMORY

(75) Inventors: Anand Krishnamurthi Kulkarni, San Jose, CA (US); Marco Sanvido, Los Altos, CA (US)

(73) Assignee: Hitachi Global Storage Technologies Netherlands B. V., Amsterdam (NL)

( * ) Notice: Subject to any disclaimer, the term of this patent is extended or adjusted under 35 U.S.C. 154(b) by 421 days.

(21) Appl. No.: 11/559,346

(22) Filed: Nov. 13, 2006

(65) Prior Publication Data

US 2008/0114930 A1     May 15, 2008

(51) Int. Cl.
G06F 12/00 (2006.01)
G06F 13/00 (2006.01)
G06F 13/28 (2006.01)

(52) U.S. Cl. ............... 711/113; 711/103; 711/117; 711/154

(58) Field of Classification Search ............ 711/113
See application file for complete search history.

(56) References Cited

U.S. PATENT DOCUMENTS

| 5,519,831 | A | * | 5/1996 | Holzhammer ............... 714/22 |
| 5,586,291 | A | | 12/1996 | Lasker et al. |
| 5,787,466 | A | | 7/1998 | Berliner |
| 5,860,083 | A | | 1/1999 | Sukegawa |
| 6,336,161 | B1 | | 1/2002 | Watts |
| 6,463,509 | B1 | * | 10/2002 | Teoman et al. ............. 711/137 |
| 2005/0246487 | A1 | | 11/2005 | Ergan et al. |
| 2005/0251617 | A1 | | 11/2005 | Sinclair et al. |
| 2007/0276994 | A1 | * | 11/2007 | Caulkins et al. ............. 711/113 |

* cited by examiner

Primary Examiner—Kevin L Ellis
Assistant Examiner—Ryan Bertram
(74) Attorney, Agent, or Firm—Thomas R. Berthold

(57) ABSTRACT

A disk drive that includes nonvolatile memory for use when the disk drive is in standby mode also uses the nonvolatile memory, together with a volatile memory, as a cache when the disk drive is in both standby and non-standby mode. Each of the data blocks stored on the disks is also stored in a cache line of either the volatile memory or the nonvolatile memory. Each cache line in both the volatile and nonvolatile memory stores one or more data blocks and an associated tag. The tag contains at least a portion of the logical block address that corresponds to the data block that is stored in the cache line. The volatile memory also has locations allocated to store tags that "shadow" the tags in the nonvolatile memory. By searching the shadow tags in the faster volatile memory, it can be determined if a data block is in the nonvolatile memory without searching the slower nonvolatile memory.

19 Claims, 2 Drawing Sheets

DISK DRIVE WITH CACHE HAVING VOLATILE AND NONVOLATILE MEMORY

BACKGROUND OF THE INVENTION

1. Field of the Invention

This invention relates generally to disk drives, and more particularly to a magnetic recording disk drive having a cache that includes nonvolatile memory.

2. Description of the Related Art

Magnetic recording hard disk drives (HDDs) typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate.

The disk drive's data controller receives the write data from the host and controls the writing to the disks and the DRAM. The transfer of the write data to the DRAM is typically done using one of two conventional methods. In a first method, called "write-back caching", the block of write data for a write command from the host is stored in DRAM, and write completion is signaled to the host when the block of write data has been received in the DRAM. The block of write data in DRAM is then later destaged from the DRAM and written to the disks. In a second method, sometimes called "write-through caching", every write to DRAM also causes a write to the disks and write completion is signaled to the host only after the block of write data has been written to the disks.

With the advent of mobile computers that are battery powered, some HDDs have a "power-save" or "standby" mode wherein the disks spin down (stop rotating) when the drive has been inactive for a period of time. The main purpose of this mode is to extend the battery life of the mobile computer. When a disk drive is in standby mode, with just the electronics active, battery power is conserved. When write data is received from the host and must be written to the disks, the drive exits standby mode and the disks spin up to enable the write data to be written, which consumes a significant amount of battery power. If this occurs too frequently, there is no power saving.

One solution to this problem is to store the write data in the DRAM when the drive is in standby mode and the disks are not rotating, and then destage the write data to the disks at some later time, as in write-cache enabled. However, because DRAM is volatile memory, there is a risk that the write data in the DRAM can be lost if the drive loses power before the write data can be destaged to the disks. Thus it has been proposed to use nonvolatile memory, e.g., "flash" memory, in addition to or in place of DRAM in HDDs used in mobile computers, during the standby mode. The primary advantage is the ability to receive write data from the host without having to exit the standby mode, thereby conserving power and extending battery life, but without any risk of losing data in the event of a power failure.

The advantage of volatile memory like DRAM for caching is its speed, but it is relatively expensive and has high power consumption. As a consequence of the cost and power requirement, caches are usually relatively small. And as a consequence of the volatility, after a resume operation, the cache is empty and will generate a lot of cache misses before being fully operative. Also, at power-down, the cache must be flushed to ensure data integrity.

The access time (i.e., the time to read or write data) for nonvolatile memory, like flash memory, is considerably longer than the access time for DRAM. Also, flash memory, unlike DRAM, has a limited number of write/erase cycles before it is no longer usable. However, despite these disadvantages, flash memory is less expensive and uses less power than DRAM.

Thus in a HDD in which the nonvolatile memory is used for caching in standby mode, it would be desirable to also optimize the use of the nonvolatile memory together with the volatile memory for caching during normal non-standby operation as well as during standby operation of the HDD.

SUMMARY OF THE INVENTION

The invention is a disk drive with a cache that includes both volatile and nonvolatile memory, with the nonvolatile memory also functioning as cache when the disk drive is not in standby mode. Each of the data blocks stored on the disks is associated with a logical block address (LBA), which identifies the physical sectors where the data block is stored. Each of the data blocks stored on the disks is also stored in a cache line of either the volatile memory or the nonvolatile memory. Each cache line in both the volatile and nonvolatile memory stores one or more data blocks and an associated tag. The tag contains a portion of the LBA that corresponds to the data block or blocks that are stored in the cache line. The volatile memory also has locations allocated to store tags that "shadow" the tags in the nonvolatile memory. Each time a data block and its tag are written to a cache line in nonvolatile memory, the tag, but not the data block, is also written to a location in volatile memory. Thus every tag in nonvolatile memory is shadowed in volatile memory. By searching the shadow tags in the faster volatile memory, it can be determined if a data block is in the nonvolatile memory without searching the slower nonvolatile memory.

Each shadow tag in the volatile memory may also have associated with it one or more count fields, e.g., a cache line write (CLW) count field and an access (read and/or write) count field. The CLW count field is incremented each time there is a write to the associated cache line in nonvolatile memory. The CLW count field enables "wear-leveling" of the cache lines in the nonvolatile memory. The objective of wear-leveling is to equally distribute the number of cache line writes across all nonvolatile memory cache lines, to thereby maximize the life of the nonvolatile memory. Thus a "wear-leveled" nonvolatile memory would result in all the CLW count fields having generally the same value. The access count field enables a frequently-accessed data block in the slower nonvolatile memory to be upgraded to the faster volatile memory, for example when the access count field for a data block exceeds a predetermined value.

The volatile memory may also include a write buffer. Data blocks that are to be written to the nonvolatile memory are written to the write buffer and then transferred from the write buffer to the nonvolatile memory in the background, i.e., when the disk drive is idle, i.e., not reading or writing to the disks, or the controller is not performing other operations.

For a fuller understanding of the nature and advantages of the present invention, reference should be made to the following detailed description taken together with the accompanying figures.

DETAILED DESCRIPTION OF THE INVENTION

Figure 1:
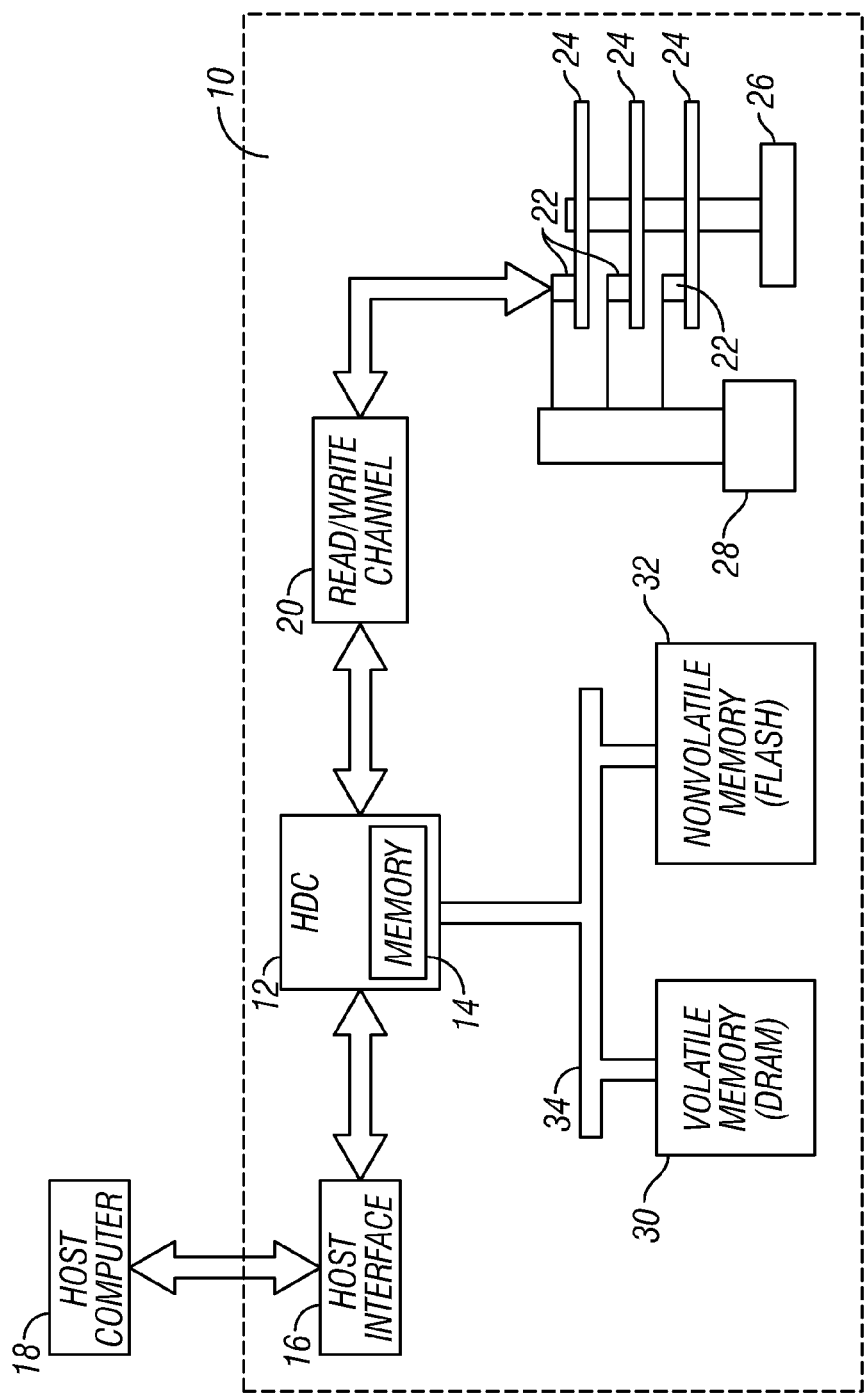
FIG. 1 is a block diagram of a magnetic recording hard disk drive (HDD) according to this invention.

FIG. 1 is a block diagram of a magnetic recording disk drive (HDD) 10 according to this invention. The HDD 10 includes a hard disk controller (HDC) 12 that can include and/or be implemented by a microcontroller or microprocessor. The controller 12 runs a computer program that is stored in memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host computer 18 may be a portable computer that can operate from battery power. The host interface 16 may be any conventional computer-HDD interface, such as Serial ATA (Advanced Technology Attachment) or SCSI (Small Computer System Interface).

The controller 12 is also connected to each of the HDD's read/write heads 22 through the read/write channel 20. The heads 22 move across the surfaces of the magnetic recording disks 24 to access concentric data tracks. The HDD 10 typically includes a stack of disks 24 that are mounted on and rotated by a spindle motor 26, with each disk surface being associated with one of the heads 22. Each of the concentric data tracks in an HDD is divided into contiguous physical sectors where the data is stored, with each physical sector being associated with a logical block address (LBA). An actuator 28 moves the heads 22 across the concentric data tracks on the disk surfaces so the heads 22 can access the desired physical sectors where the data is to be read or written.

The controller 12 acts as a data controller to transfer blocks of write data from the host computer 18 through the read/write channel 20 for writing to the disks 24 by the heads 22, and to transfer blocks of read data from the disks 24 back to the host computer 18. The controller 12 also communicates with volatile memory 30 and nonvolatile memory 32 via data bus 34. One type of volatile memory 30 may be dynamic random access memory (DRAM). One type of nonvolatile memory 32 may be flash memory. Flash memory stores information in an array of floating gate transistors, called "cells", and can be electrically erased and reprogrammed in blocks.

In a HDD the speed at which data can be written to the disks is determined by a number of physical constraints. For example, if the head to do the writing is positioned over one area of its associated disk and a block of data is to be written at another area of the disk, there is a "seek time" delay for the head to be moved between the concentric data tracks. Also, there is a "rotational latency" delay required for the disk to rotate to the proper position relative to the head so the head can access the proper physical sector. Thus, the host computer must wait for the disk drive to complete the write operation. To reduce this waiting time the block of write data from the host computer 18 is first written into cache, i.e., the volatile memory 30 (typically DRAM). The locations or addresses in the cache where the cached data blocks are stored are also called "cache lines". A block of data stored in a cache line also has a "tag" associated with it that contains the LBA where the block of data is also to be stored on the disks. Typically multiple blocks of data are stored in a single cache line. After the block of write data has been written to the cache, the host computer can continue with operations without waiting until the write operation is complete. The block of write data is later removed or destaged from the cache and written to the disk. The controller 12 typically applies one of several well-known scheduling algorithms, based upon factors including seek time, rotational latency, and the size of the write cache, to determine which blocks of write data are removed from cache and the time at which the blocks are written to the disks.

When the HDD 10 is in "power-save" or "standby" mode with the disks not rotating, caching also takes place but the controller 12 directs the write data from the host computer 18 to the nonvolatile memory 32. Write data that is already stored in the volatile memory 30 when standby mode is initiated may also be transferred to the nonvolatile memory 32. This assures that the write data will not be lost if there is a loss of power to the HDD 10 during the power-save mode. This mode of operation allows the HDD 10 to receive write data from the host computer 18 without having to spin the disks back up, thereby conserving power and extending battery life, but without any risk of losing data in the event of a power failure.

Figure 2:
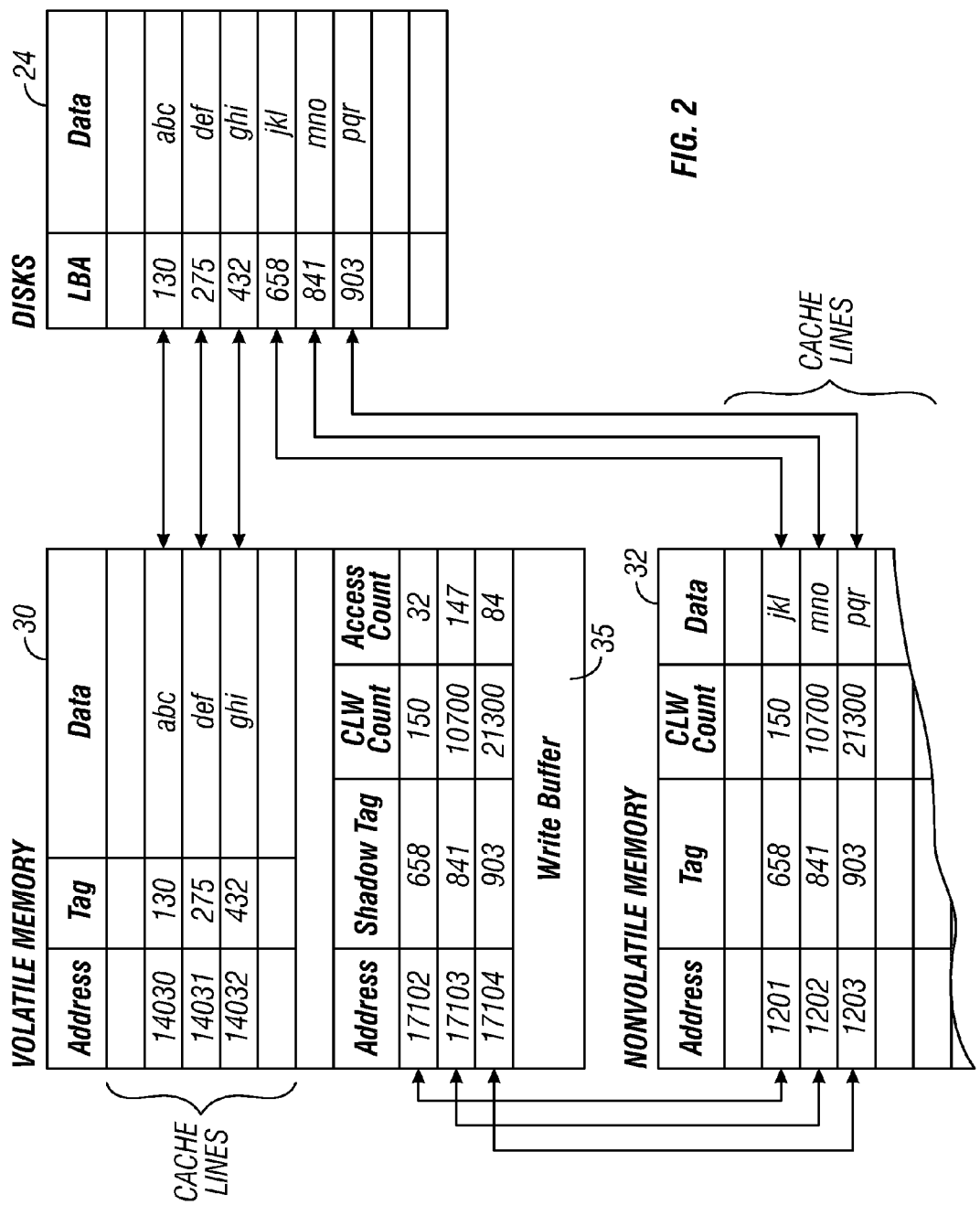
FIG. 2 is a schematic illustrating the data layout and structure among the disks, and the volatile memory and nonvolatile memory making up the cache, in a HDD.

In this invention, the cache includes both the volatile memory 30 and the nonvolatile memory 32, with the nonvolatile memory 32 also functioning as cache when the disk drive is not in standby mode. The volatile memory 30 is faster and possibly smaller than the larger and slower nonvolatile memory 32. FIG. 2 is a schematic illustrating the data layout and structure among the cache (volatile memory 30 and the nonvolatile memory 32) and the disks 24. Each of the data blocks stored on the disks is associated with a LBA, which identifies the physical sectors where the data block is stored. Some of the data blocks stored on the disks are also stored in either the volatile memory 30 or the nonvolatile memory 32 of the cache. Each cache line in both the volatile memory 30 and nonvolatile memory 32 has an address and stores one or more data blocks and an associated tag. The tag contains a portion of the LBA that corresponds to the first data block that is stored in the cache line. As shown by an example in FIG. 2, data blocks for LBAs 130, 275 and 432 match data blocks in cache lines with tags 130, 275 and 432, respectively, in volatile memory 30; and data blocks for LBAs 658, 841 and 903 match data blocks in cache lines with tags 658, 841 and 903, respectively, in nonvolatile memory 32. The example in FIG. 2 is a simplified schematic for ease of explanation and shows only a single data block stored in each cache line. In actuality each cache line would typically contain multiple data blocks corresponding to the data blocks stored in multiple adjacent sectors on the disks. Thus in this typical case the tag would need to be only a portion of the LBA of the first data block because the data blocks corresponding to the adjacent data sectors would share the most significant bits of the LBA of the first data block. Thus each tag contains at least a portion of an LBA, or the entire LBA if only a single data block is stored in the associated cache line.

The volatile memory 30 also has locations allocated to store tags that "shadow" the tags in the nonvolatile memory 32. Each time a data block and its tag are written to a cache line in nonvolatile memory 32 the tag, but not the data block, is also written in volatile memory 30. Thus every tag in nonvolatile memory 32 is shadowed in volatile memory 30. The use of shadow tags enables the controller 12 to determine if data is in the nonvolatile memory 32 of the cache by accessing the faster volatile memory 30, rather than the slower nonvolatile memory 32. Each shadow tag may also have associated with it a cache line write (CLW) count field and an access count field. The CLW count is incremented each time there is a write to the associated cache line in nonvolatile memory 32. The use of the CLW count field enables controller 12 to level the "wear" of the nonvolatile memory cache lines, for example by selecting a cache line with a lower CLW count value if the previously selected cache line has a count value that exceeds a predetermined threshold value. The CLW count fields are also stored in nonvolatile memory 32, because these values need to be recovered at disk drive start-up. The access count fields in the volatile memory 30 are used to track the number of accesses to the data blocks to enable "upgrading" frequently-accessed data from nonvolatile memory 32 to the faster volatile memory 30. As used herein "access" may mean "read from", "written to", or both "read from" and "written to".

The volatile memory 30 also includes a portion allocated for a write buffer 35. Data blocks that are to be written to the nonvolatile memory 32 are written to the write buffer 35. The data blocks are then transferred from the write buffer 35 to the nonvolatile memory 32 in the background, i.e., when the controller 12 is idle, so there is no performance hit.

The operation of the HDD with the cache according to this invention will now be explained for the read and write possibilities: a read cache hit, a read cache miss, a write cache hit and a write cache miss.

When the controller 12 receives a read command from host computer 18 to retrieve a data block, it looks first to cache. The controller 12 searches the volatile memory 30 by comparing the LBA for the read command to all tags and shadow tags in the volatile memory 30. If the controller 12 finds that the tag or shadow tag is in the volatile memory 30 a read cache "hit" has occurred. If it is a tag that is in volatile memory 30 then the data block for the tag is also in volatile memory 30 and it is immediately read and returned to the host computer 18. However, if it is a shadow tag that is in volatile memory then the data block for the shadow tag is in nonvolatile memory 32. The controller 12 then reads the associated cache line from nonvolatile memory 32 and returns the data block to host computer 18. The controller 12 also increments the access count field associated with that shadow tag to keep track of the number of accesses to that data block.

If the controller 12 does not find either the tag or the shadow tag for the LBA in the volatile memory 30, then a read cache "miss" has occurred, and the requested data block must be read from the disks 24. The controller 12 then reads the data block associated with the LBA from the disks 24 and returns it to the host computer 18. If a copy of the data block is to be saved in the cache, then the controller 12 may write the data block to either volatile memory 30 or nonvolatile memory 32. If it is written to volatile memory 30, there is no performance hit. However, if all cache lines in volatile memory 30 are full, then a data block from an existing cache line must be evicted. The controller 12 will implement a replacement policy to determine which cache line to evict. There are a variety of known replacement policies, such as "LRU" which replaces the least recently used data blocks. Instead of evicting an existing data block, the controller 12 may move it to nonvolatile memory 32. Since this is a relatively time-consuming operation, the data block is saved in the write-buffer 35, and a background write is started to move it to a cache line in nonvolatile memory 32. If an existing data block in volatile memory 30 is moved to nonvolatile memory 32 then the controller 12 writes it to the write buffer 35, writes the tag and data block to a cache line in nonvolatile memory 32 in background, writes the shadow tag to a location in volatile memory 30, and increments the CLW count field in both volatile memory 30 and nonvolatile memory 32.

If after the read cache miss the copy of the data block read from the disks 24 is to be written in nonvolatile memory 32 instead of volatile memory 30, then the controller 12 writes it to the write buffer 35, writes the tag and data block to a cache line in nonvolatile memory 32 in background, writes the shadow tag to a location in volatile memory 30, and increments the CLW count field in both volatile memory 30 and nonvolatile memory 32.

The decision to write the data block to either volatile memory 30 or nonvolatile memory 32 is determined by an algorithm, implemented as a computer program or set of instructions executed by the controller 12. In a first example, each new data block to be written is written to volatile memory 30, but if volatile memory 30 is full it is written to nonvolatile memory 32. In a second example, each new data block to be written is written to volatile memory 30, but if volatile memory 30 is full a cache line is evicted and the data block in that cache line is moved to nonvolatile memory 32. In a third example, the LBA for each new data block to be written is checked against a range of LBAs for "hot" or frequently-accessed data. If the LBA is within the range that data block is written to the volatile memory 30, which provides faster access, and if it is not within that range it is written to nonvolatile memory 32.

When the controller 12 receives a write command from host computer 18, it looks first to cache. The controller 12 compares the LBA for the write command to all tags and shadow tags in the volatile memory 30. If the controller 12 finds that the tag or shadow tag is in the volatile memory 30 a write cache "hit" has occurred, and the cache line associated with the tag or shadow tag must be updated with the new data block. The cache line is also marked as "dirty" if "write-back" caching is implemented. If it is a tag that is found, then the data block for that tag is also in volatile memory 30 and the cache line is immediately updated with the new data block. However, if it is a shadow tag that is found, the data block for the shadow tag is in nonvolatile memory 32. The controller 12 then writes the new data block to the write buffer 35 for background writing to the cache line in the nonvolatile memory 32. The controller 12 also increments the CLW count field in both volatile memory 30 and nonvolatile memory 32 to keep track of the number of writes to the associated cache line in nonvolatile memory 32.

If the controller 12 does not find either the tag or the shadow tag for the LBA in the volatile memory 30, then a write cache "miss" has occurred, and the new data block must be written to cache. This is like the above-described process for writing a copy of a data block after a read cache miss. The controller 12 may write the data block to either volatile memory 30 or nonvolatile memory 32. If it is written to the volatile memory 30 there is no performance hit, but if all cache lines in volatile memory 30 are full, then an existing cache line must be evicted or the controller 12 may move an existing data block existing to nonvolatile memory 32. Since this is a relatively time-consuming operation, the data block to be moved is saved in the write-buffer 35, and a background write is started to move it to a cache line in nonvolatile memory 32. If an existing data block in volatile memory 30 is moved to nonvolatile memory 32 the controller writes a shadow tag for that data block in volatile memory 30 and also increments the CLW count field in both volatile memory 30 and nonvolatile memory 32.

If after the write cache miss the data block is to be written in nonvolatile memory 32 instead of volatile memory 30, then the controller 12 writes it to the write buffer 35, writes the tag and data block to a cache line in nonvolatile memory 32 in background, writes the shadow tag to a location in volatile memory 30 and also increments the CLW count field in both volatile memory 30 and nonvolatile memory 32.

The algorithms described above for determining whether to write to volatile memory 30 or nonvolatile memory 32 when there is a read cache miss may also apply to when there is a write cache miss. In another example, in the case of a write cache miss, the controller 12 may sort all of the write commands by LBA and select the blocks of write data for outlying LBAs (those that would required the longest seek time) as those to be written to nonvolatile memory 32. This algorithm is advantageous for write-through caching because the write data can be written to the slower nonvolatile memory 32 during the time it takes to seek and write to the disks.

The CLW count fields associated with the shadow tags in volatile memory 30 enable the controller 12 to run a "wear-leveling" algorithm, implemented as a computer program or set of instructions executed by the controller 12. The objective of wear-leveling is to equally distribute the number of cache line writes across all nonvolatile memory cache lines to thereby maximize the life of the nonvolatile memory 32. Thus a successful wear-leveling would result in the controller 12 maintaining all the CLW count fields to have generally the same value. The algorithm may be run in the background on a periodic basis. In one example, the controller 12 will evict the cache line at the address with the lowest value in its CLW count field. For example, referring to FIG. 2, the CLW count field at volatile memory 30 address 17102 has the lowest value of 150, so the data block "jkl" in the cache line at address 1201 in nonvolatile memory 32 will be evicted. Then the next data block to be written to nonvolatile memory 32 will be written in the cache line at that address, i.e. address 1201 in this example. This assures that the cache lines with the lowest values in their CLW count fields (the least-recently-used addresses) are written to first.

The access count fields associated with the shadow tags in volatile memory 30 also enable the controller 12 to run an "upgrade/downgrade" algorithm, implemented as a computer program or set of instructions executed by the controller 12. If the access count for a shadow tag reaches a threshold value, indicating frequent accesses to the associated data block in nonvolatile memory 32, that data block can be "upgraded" to volatile memory 30, where the access is much faster. This avoids a performance penalty for frequent accesses to the slower nonvolatile memory 32. If the volatile memory 30 is full at upgrade of a data block, a cache line can be evicted or a data block "downgraded" to nonvolatile memory 32.

In this invention, because the nonvolatile memory 32 is used as cache rather than addressable memory, the cache lines are location independent. Thus an optional bad block marker can be added to the tag, either as a separate bit, or a bit appended to the tag. When the controller 12 writes to a cache line in nonvolatile memory 32 it receives a status response, indicating that the write is either successful or unsuccessful. If unsuccessful, the controller 12 changes the bad block bit to indicate that cache line as bad. Thus for all future writes, that cache line is skipped.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive comprising:
   a rotatable recording disk for the storage of user data from a host computer;
   a controller for writing user data to and reading user data from the disk; and
   a cache connected to the controller for temporary storage of user data, the cache comprising nonvolatile memory having a plurality of cache lines for the storage of user data and volatile memory having a plurality of cache lines for the storage of user data and a cache line write (CLW) count field associated with each nonvolatile memory cache line for representing the number of times the associated nonvolatile memory cache line has been accessed;
   wherein the controller includes logic for executing method acts comprising:
   in response to a request from the host computer, searching the volatile memory to determine if the requested user data is stored in the nonvolatile memory; and
   when writing new user data to nonvolatile memory, first evicting the user data from a cache line having the smallest CLW count field value, and thereafter writing the new user data to said cache line having the smallest CLW count field value.

2. The disk drive of claim 1 wherein the disk has a plurality of concentric data tracks, each data track including a plurality of contiguous sectors for the storage of user data, each sector having an associated logical block address (LBA); wherein the nonvolatile memory cache lines include storage for tags associated with user data, each tag identifying at least a portion of an LBA; wherein the volatile memory includes locations for the storage of shadow tags, each shadow tag corresponding to an associated tag in nonvolatile memory; and wherein the act of searching the volatile memory comprises searching the shadow tags.

3. The disk drive of claim 2 wherein the controller includes logic for executing method acts further comprising:
   when writing user data and its associated tag to a nonvolatile memory cache line, writing the associated shadow tag to a location in volatile memory.

4. The disk drive of claim 2 wherein the controller includes logic for executing method acts further comprising:
   writing new user data to an available cache line in volatile memory;
   prior to said writing new user data, determining if there is an available cache line in volatile memory and if there is not then evicting user data from a cache line to make a cache line available.

5. The disk drive of claim 2 wherein the controller includes logic for executing method acts further comprising:
   writing new user data to an available cache line in volatile memory;
   prior to said writing new user data, determining if there is an available cache line in volatile memory and if there is not then transferring user data from a cache line in volatile memory to a cache line in nonvolatile memory to make a cache line available in volatile memory.

6. The disk drive of claim 5 wherein the volatile memory includes a write buffer and wherein transferring user data to a cache line in volatile memory comprises writing the user data to the write buffer and thereafter writing the user data in the write buffer to a cache line in nonvolatile memory when the controller is idle.

7. The disk drive of claim 1 wherein the controller includes logic for executing method acts further comprising:
   transferring user data from a nonvolatile memory cache line accessed more than a predetermined number of times to a volatile memory cache line.

8. The disk drive of claim 7 wherein the volatile memory includes an access count field associated with user data stored in nonvolatile memory, and wherein the controller includes logic for executing method acts further comprising:

prior to transferring user data from a nonvolatile memory cache line, determining if the access count field associated with the user data is greater than a predetermined value.

9. A magnetic recording disk drive comprising:
a rotatable magnetic recording disk for the storage of blocks of data from a host computer, the disk having a plurality of concentric data tracks, each data track including a plurality of contiguous sectors for the storage of data blocks, each sector having an associated logical block address (LBA);
a read/write head movable across the surface of the disk for writing data blocks to the sectors and reading data blocks from the sectors;
a controller adapted for connection to the host computer for transferring data blocks between the host computer and the sectors on the disk in response to read and write commands from the host computer; and
a cache connected to the controller and comprising (a) nonvolatile memory having a plurality of cache lines for the storage of data blocks and associated tags, each tag identifying at least a portion of an LBA; and (b) volatile memory having a plurality of cache lines for the storage of data blocks and associated tags, each tag identifying at least a portion of an LBA, and a plurality of locations for the storage of shadow tags, each shadow tag corresponding to an associated tag in nonvolatile memory;
wherein the controller includes logic for executing method acts comprising:
when writing a data block and its associated tag to a cache line in nonvolatile memory, writing said associated tag for said written data block as a shadow tag to a location in volatile memory.

10. The disk drive of claim 9 wherein the controller includes logic for executing method acts comprising:
in response to a read command, searching the shadow tag locations in volatile memory to determine if the requested data block is stored in nonvolatile memory.

11. The disk drive of claim 9 wherein the controller includes logic for executing method acts comprising:
searching the shadow tag locations in volatile memory prior to writing a data block to a cache line in nonvolatile memory.

12. The disk drive of claim 9 wherein the controller includes logic for executing method acts comprising:
writing a new data block to an available cache line in volatile memory;
prior to said writing a new data block, determining if there is an available cache line in volatile memory and if there is not then evicting a data block from a cache line to make a cache line available.

13. The disk drive of claim 9 wherein the controller includes logic for executing method acts comprising:
writing a new data block to an available cache line in volatile memory;
prior to said writing a new data block, determining if there is an available cache line in volatile memory and if there is not then transferring a data block from a cache line in volatile memory to a cache line in nonvolatile memory to make a cache line available in volatile memory.

14. The disk drive of claim 13 wherein the volatile memory includes a write buffer and wherein transferring a data block from a cache line in volatile memory comprises writing the data block to the write buffer and thereafter writing the data block in the write buffer to a cache line in nonvolatile memory when the controller is idle.

15. The disk drive of claim 9 wherein the volatile memory includes an access count field associated with data stored in nonvolatile memory, and wherein the controller includes logic for executing method acts further comprising:
transferring data from nonvolatile memory to volatile memory if the access count field associated with the data is greater than a predetermined value.

16. The disk drive of claim 9 wherein the volatile memory includes a cache line write (CLW) count field associated with each nonvolatile memory cache line for storing a CLW count value representing the number of times the associated nonvolatile memory cache line has been written to.

17. The disk drive of claim 16 wherein the controller includes logic for executing method acts comprising:
transferring a data block from a nonvolatile memory cache line to a volatile memory cache line if the CLW count value for the associated nonvolatile memory cache line is greater than a predetermined value.

18. The disk drive of claim 16 wherein the controller includes logic for executing method acts comprising:
maintaining the CLW count fields to have generally the same value.

19. The disk drive of claim 18 wherein the act of maintaining the CLW count fields to have generally the same value comprises the acts of:
when writing a new data block to nonvolatile memory, first evicting the data block from a cache line having the smallest CLW count value; and
thereafter writing the new data block to said cache line having the smallest CLW count value.

* * * * *